United States Patent
Inoue et al.

[19]

[11] Patent Number: 6,093,360
[45] Date of Patent: Jul. 25, 2000

[54] GOLF BALL INJECTION MOLD AND METHOD FOR INJECTION MOLDING GOLF BALLS

[75] Inventors: Michio Inoue; Keisuke Ihara, both of Chichibu, Japan

[73] Assignee: Bridgestone Sports Co., Ltd., Tokyo, Japan

[21] Appl. No.: 09/123,356

[22] Filed: Jul. 28, 1998

[30] Foreign Application Priority Data

Jul. 28, 1997 [JP] Japan ..................................... 9-217045

[51] Int. Cl.[7] ............................. B29C 45/14; B29C 45/27
[52] U.S. Cl. .................... 264/278; 264/328.12; 425/116; 425/120; 425/125; 425/573
[58] Field of Search ..................... 425/116, 117, 425/120, 125, 127, 573; 264/278, 328.12

[56] References Cited

U.S. PATENT DOCUMENTS

| | | | |
|---|---|---|---|
| 2,361,348 | 10/1944 | Dickson et al. | 425/116 |
| 4,959,000 | 9/1990 | Giza | 425/116 |
| 5,122,046 | 6/1992 | Lavallee et al. | 425/116 |
| 5,407,341 | 4/1995 | Endo et al. | 425/116 |
| 5,489,631 | 2/1996 | Dubois | 264/328.12 |
| 5,824,258 | 10/1998 | Yamaguchi | 425/116 |
| 5,882,567 | 3/1999 | Cavallaro et al. | 264/278 |

*Primary Examiner*—Robert Davis
*Attorney, Agent, or Firm*—Sughrue, Mion, Zinn, Macpeak & Seas, PLLC

[57] ABSTRACT

An injection mold includes a pair of mold sections which are removably mated to define a spherical cavity by their concave surfaces, support pins disposed in the mold sections for movement into and out of the cavity, and gates connected to the cavity for feeding a cover molding material from an injection molding machine into the cavity. A golf ball having a core and a cover is prepared by supporting the core in the cavity by the support pins, and injecting the cover molding material between the core and the cavity-defining surface through the gates, thereby molding the cover around the core. The gates are oriented relative to the cavity such that the cover molding material is injected in a direction off the center of the core.

5 Claims, 6 Drawing Sheets

PRIOR ART

FIG.8(B)

PRIOR ART

GOLF BALL INJECTION MOLD AND METHOD FOR INJECTION MOLDING GOLF BALLS

BACKGROUND OF THE INVENTION

1. Field of the Invention

This invention relates to a golf ball injection mold and a method for injection molding golf balls using the mold.

2. Prior Art

The methods in the prior art for molding golf balls using a mold, especially the methods for preparing golf balls consisting of a core and a cover by molding the cover around the core using a mold include injection molding and heat compression molding.

Figure 7:
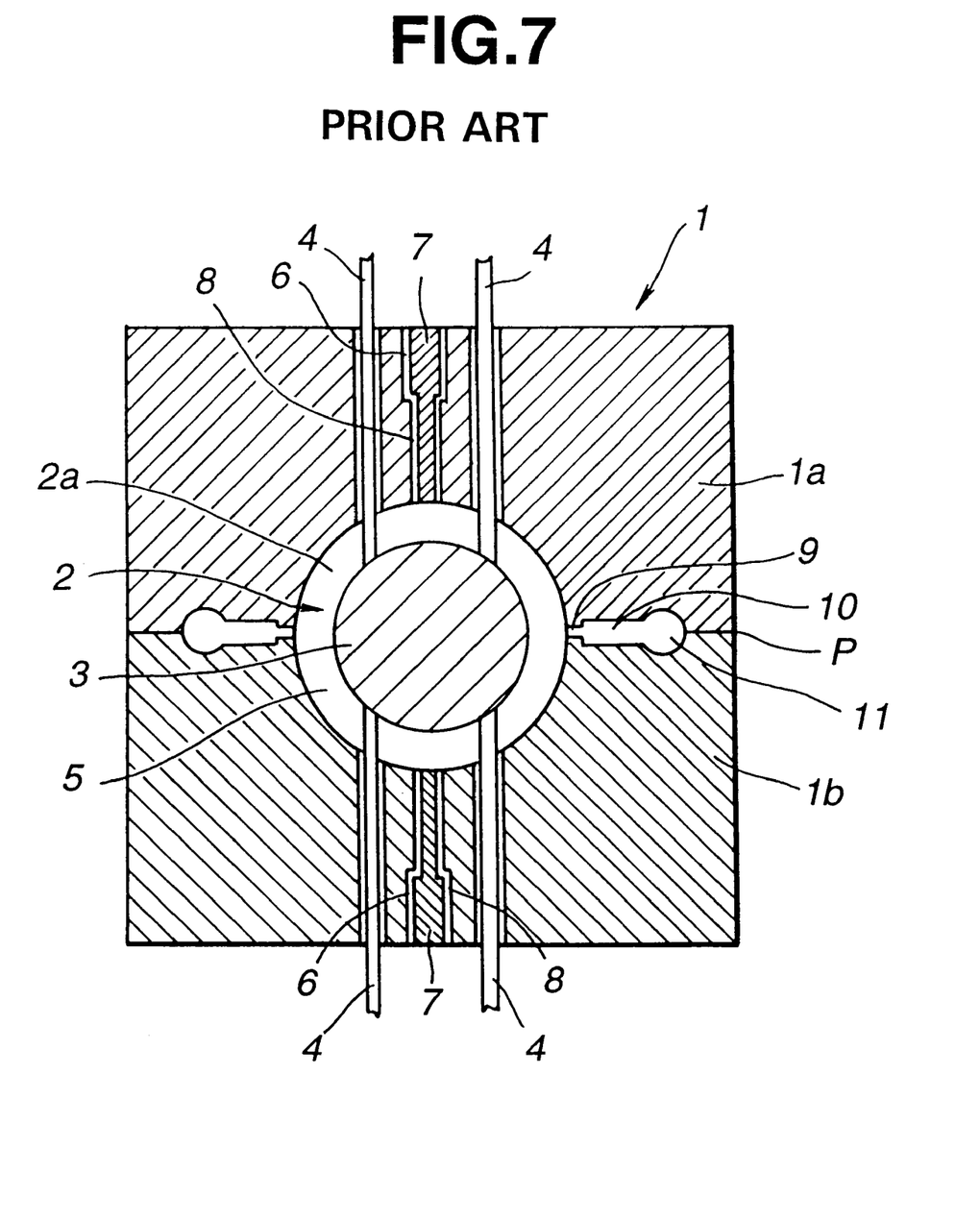
FIG. 7 is a cross-sectional view of an inventive or prior art golf ball injection mold.
Figure 8A:
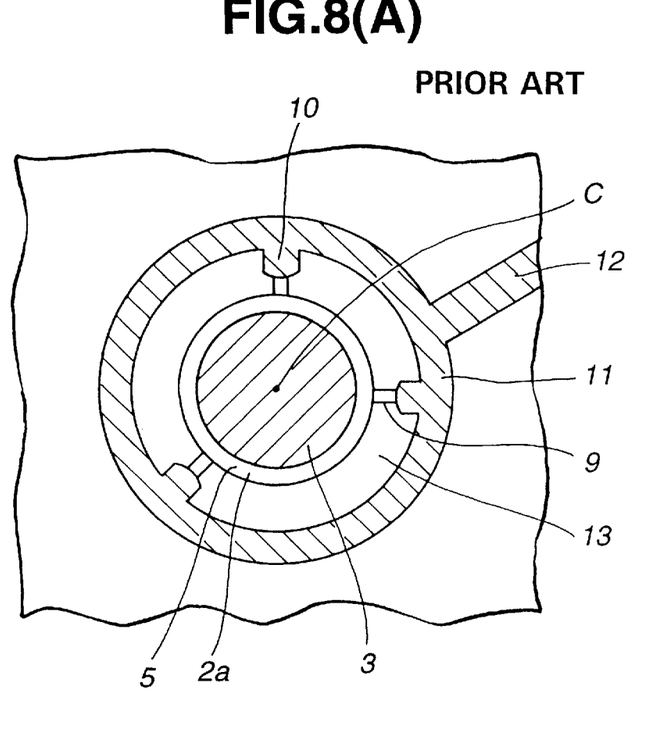
FIG. 8A is a horizontal cross section and FIG. 8B is an enlarged view of a gate portion of the prior art mold.
Figure 8B:
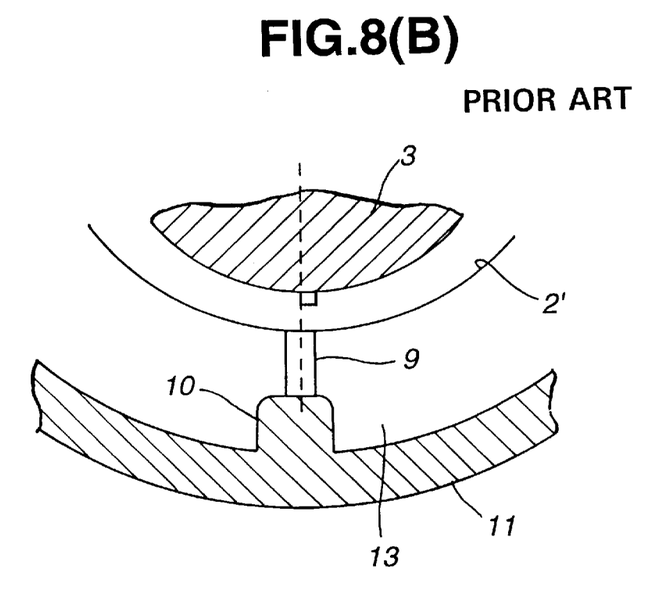

Of these, the injection molding method is widely utilized because formation of fins is minimized and the entire process is simple in that extra steps of preforming half cups and placing half cups around the core as required in the heat compression molding method are unnecessary. The injection molding method is described by referring to the manufacture of two-piece solid golf balls. FIG. 7 and FIG. 8 are schematic cross-sectional views of a prior art injection mold. As shown in FIG. 7, a cover-molding mold 1 includes an upper mold section 1a and a lower mold section 1b, which are mated along a parting plane P to define a hollow spherical cavity 2 therein. The cavity-defining surfaces of the mold sections are provided with dimple-forming protrusions (not shown). A solid core 3 is placed in the cavity 2 as an insert. The core 3 is vertically supported by a plurality of vertically extending support pins 4 so that the core is positioned at the center of the cavity 2. A space 2a is defined between the core 3 and the cavity-defining surface. In this state, a cover stock based on thermoplastic resin is melted in an injection cylinder of an injection molding machine (not shown). A cover stock injection path is shown in FIGS. 8A and 8B as including a main runner 12 connected to the injection cylinder, an annular cold runner 11 connected to the runner 12, and a plurality of nozzles 10 disposed in a cavity surrounding portion 13 and equidistantly spaced on the inner circumferential side of the annular runner 11, each nozzle 10 having a gate 9 in communication with the cavity 2. The molten cover stock is introduced to the annular cold runner 11 through the main runner 12, and then injected into the space 2a through the gates 9 of the nozzles 10. Immediately before the injection of the cover molding material 5 is completed or at the same time as the completion of injection, the support pins 4 are withdrawn until their distal ends are flush with the cavity-defining surface. In this way, the core 3 is enclosed with a cover having a multiplicity of dimples. After cooling, the upper mold section 1a is opened and the molded golf ball is released from and taken out of the lower mold section 1b.

It is noted that in FIG. 7, a pin 7 is fixedly received in a hole 6 to define a venting space 8 at each of opposite poles. During molding, air in the mold cavity 2 is displaced outside through the venting spaces 8.

As shown in FIGS. 8A and 8B, the gate 9 is joined to the cavity 2 such that the angle of connection of the gate to the cavity surface 2' is perpendicular as measured relative to a tangent to the cavity surface 2' at the connection. The cover molding material is then injected toward the center C of the core 3. Since the core 3 is supported by the support only pins 4, there is a possibility that the support will not withstand the injection pressure of the cover molding material from the gates 9, and the core 3 will be off-centered or compression deformation is yielded at the portions of receiving the injection pressure on the core. Particularly when a thin gage cover is injection molded over a large diameter core, the space between the core and the cavity-defining surface is fairly narrow and thus requires a higher injection pressure than usual. As a result, a higher injection pressure is applied to the core, with a more likelihood of the core being off-centered. Then the molded golf ball is reduced in symmetry so that the ball may differ in distance or trajectory depending on the position where it is hit, failing to acquire stable flight performance.

SUMMARY OF THE INVENTION

Therefore, an object of the invention is to provide a novel and improved injection mold capable of molding golf balls featuring minimized off-centering of the core or minimized compression deformation and improved symmetry even when the cover is thin.

Another object of the invention is to provide a method for injection molding golf balls using the mold.

In a first aspect, the invention provides a golf ball injection mold comprising a pair of mold sections which are removably mated to define a spherical cavity by their concave surfaces, a plurality of support pins disposed in the mold sections for movement into and out of the cavity, and a plurality of gates disposed in fluid communication with an injection molding machine and the cavity for feeding a cover molding material from the injection molding machine into the cavity. A golf ball having a core and a cover is prepared by moving the support pins into the cavity for supporting the core at the center of the cavity, injecting the cover molding material into the space between the core and the cavity-defining surface through the gates, and withdrawing the support pins from the cavity when the space is filled with the cover molding material, thereby molding the cover around the core. According to the invention, the gates are oriented relative to the cavity such that the cover molding material is injected in a direction off the center of the core.

In one preferred embodiment of the invention, the gates are joined to the cavity-defining surface at an angle of 15° to 75° relative to a tangent to the cavity-defining surface. Also preferably, the gates are disposed at an equal spacing in the parting plane between the mold sections, and each gate is defined in a tubular form when the mold sections are mated; or the gates are disposed at an equal spacing along a longitude on the cavity. Typically, four (4) to sixteen (16) gates are disposed in the mold. Further preferably, the gates are oriented such that the sum of the vectors representing the forces of cover molding material portions injected into the cavity therethrough is zero. There is obtained a golf ball which is minimized in off-centering of the core and improved in symmetry.

In a second aspect, the invention provides a method for injection molding a golf ball having a core and a cover using the inventive mold described above by removably mating the mold sections to define a hollow spherical cavity by their concave surfaces, placing the core in the cavity, moving the support pins into the cavity for supporting the core at the center of the cavity, injecting a cover molding material into the space between the core and the cavity-defining surface through the gates, and withdrawing the support pins from the cavity when the space is filled with the cover molding material, thereby molding the cover around the core.

According to the invention, the connection of the gates to the cavity is oblique relative to a tangent to the cavity-defining surface such that the injection direction of the cover molding material is off the center of the core, allowing the lateral force (or pressure) of the cover molding material applied to the core to be reduced. This prevents the core from being off-centered even when the cover is as thin as 2.0 mm or less, especially 0.5 to 1.85 mm. The cover can be effectively molded around the core.

More particularly, in an injection mold, the connection angle of the gates to the cavity-defining surface is oblique to a tangent to the cavity-defining surface and especially, the connection angle of the gates to the cavity-defining surface is adjusted such that when the vectors representing the forces (or pressure) of cover molding material portions injected into the cavity therethrough are summed at the center of the core, the sum is zero or as small as possible. More preferably the gates are joined to the cavity-defining surface at an angle of 15° to 75° relative to a tangent to the cavity-defining surface. Also preferably, the gates are disposed at an equal spacing in the parting plane between the mold sections or at an equal spacing along a longitude on the hollow spherical cavity. Then, without a need to reduce the original injection pressure applied to the molding material by the molding machine or even when the original injection pressure is increased, the force (or pressure) of the cover molding material applied to the core can be uniformly and effectively reduced. The core can be kept accurately located at the center of the thus molded ball. There is obtained a golf ball which is improved in symmetry. Even when a thin-wall cover is formed by injection molding around a large-diameter core of a single or plural layer structure (requiring a greater injection pressure), the lateral force (or pressure) of the cover molding material applied to the core can be effectively reduced, which is effective for minimizing the off-centering of the core and eliminating defective molding.

BRIEF DESCRIPTION OF THE INVENTION

The above and other objects, features and advantages of the invention will better understood from the following description taken in conjunction with the accompanying drawings.

FIG. 1 is a cross-sectional view of a golf ball injection mold according to one embodiment of the invention, FIG. 1A being a horizontal cross section and FIG. 1B being an enlarged view of a gate portion of the mold.

FIG. 6 illustrates how to measure the pressure applied to a cover molding material during injection, FIG. 6A being a horizontal cross section and FIG. 6B being a cross section taken along lines I—I in FIG. 6A.

DETAILED DESCRIPTION OF THE INVENTION

Referring to FIGS. 1 to 6, several embodiments of the golf ball mold according to the invention are described. Throughout the figures, like parts are designated by the same numerals as in FIGS. 7 and 8 and their description is omitted.

Figure 1A:
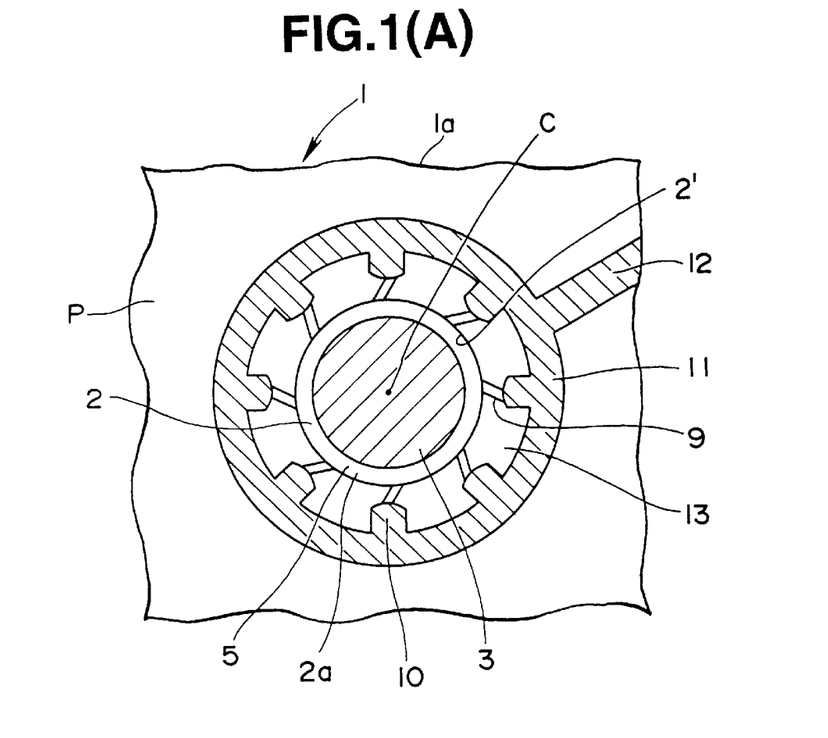
Figure 1B:
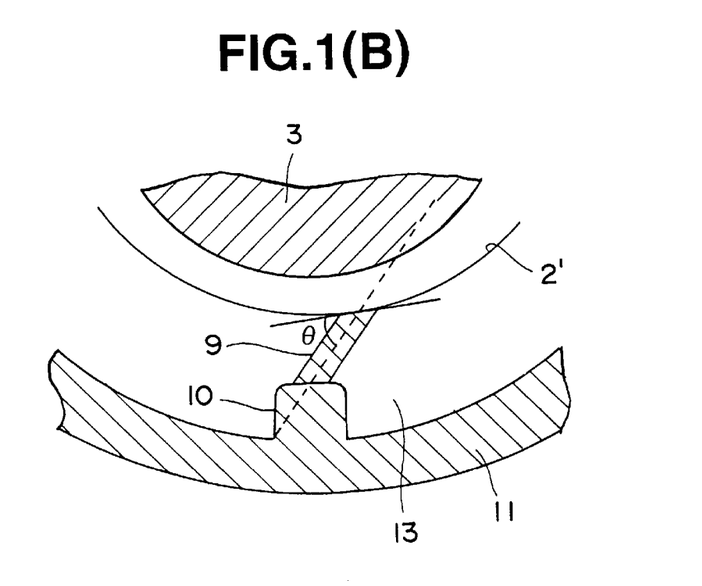
Figure 2:
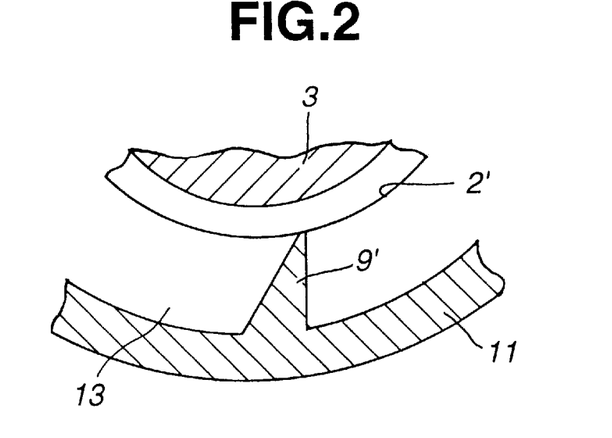
FIG. 2 is a view similar to FIG. 1B, showing another example of the gate.
Figure 3:
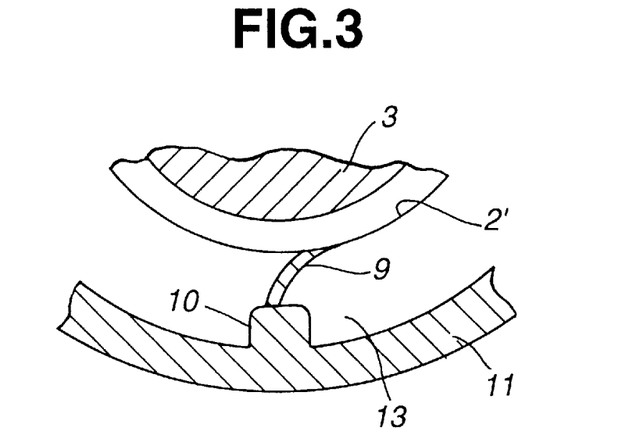
FIG. 3 is a view similar to FIG. 1B, showing a further example of the gate.
Figure 4:
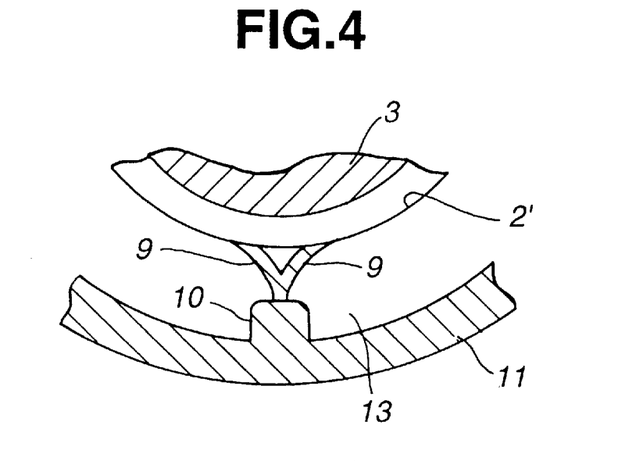
FIG. 4 is a view similar to FIG. 1B, showing a still further example of the gate.

The outline of the injection mold according to the invention is the same as the injection mold illustrated in FIG. 7. In one embodiment, the gates 9 are disposed in the parting plane P (corresponding to the equatorial pane of the hollow spherical cavity 2) between the upper and lower mold sections 1a and 1b, and each gate is defined in a tubular form when the mold sections are mated. According to the invention, the gates 9 are oriented relative to the cavity 2 such that the cover molding material 5 is injected in a direction off the center C of the core 3. More particularly, the gates 9 are joined to the cavity-defining surface 2' at an angle θ relative to a tangent to the cavity-defining surface 2' as shown in FIGS. 1A and 1B. The gates 9 are formed in the cavity surrounding portion 13 and oriented relative to the cavity such that the joint angle θ is non-perpendicular, preferably 15° to 75°, more preferably 30° to 60°, most preferably 40° to 58°, relative to a tangent to the cavity-defining surface 2'. If the joint angle θ is less than 15°, then too acute an edge is defined between the gate and the cavity-defining surface, which edge is likely to be broken. If the joint angle θ is more than 75°, then the core can be deformed or displaced by the injection pressure.

The number of the gates 9 is not critical although the number of gates in the entire mold is preferably 4 to 16, more preferably 6 to 12. The gates 9 or nozzles 10 are disposed at an equal spacing in the cavity surrounding portion 13 and at the parting plane P between the mold sections 1a and 1b. Further preferably, the nozzles 10 of each pair are diametrically opposed and the gates are oriented such that the sum of the vectors representing the forces of cover molding material portions injected into the cavity therethrough is zero at the core center C or as small as possible (i.e., substantially zero) at the core center C. This prevents the core from being off-centered and allows equal injection pressures to be applied to the core, contributing to uniform molding. Preferably the joint angles θ of the respective gates 9 have the same direction and the same value.

The configuration of the gates 9 is not critical. Preferably the gates 9 are tubular and circular in cross section. The diameters of the respective gates 9 should preferably have the same value in order to make uniform the injection pressures applied to the core and to prevent the core from being off-centered. Preferably, the gates have a diameter of 0.5 to 2.0 mm, more preferably 0.8 to 1.2 mm.

In the embodiment shown in FIG. 1B, the gates 9 are formed straight and at the tips of the nozzles 10 which are disposed in the cavity surrounding portion 13 and along the inner circumference of the annular cold runner 11 connected to the main runner 12 as shown in FIG. 1A. In the embodiment shown in FIG. 2, the nozzle 10 and the gate 9 are integrated and formed in a conical shape 9' tapered to the tip. In the embodiment shown in FIG. 3, the gate 9 is formed in moderate arch form. In the embodiment shown in FIG. 4, the gate 9 is bifurcated. The gate 9 may be branched into three or more if desired while it is preferred that all the branched gates have an identical diameter. Such multi-branched gates are effective for reducing the injection pressure applied to the core. The multi-branched gates have the advantages that the cover can be effectively molded around the core and the number of nozzles in the mold can be reduced.

Figure 5:
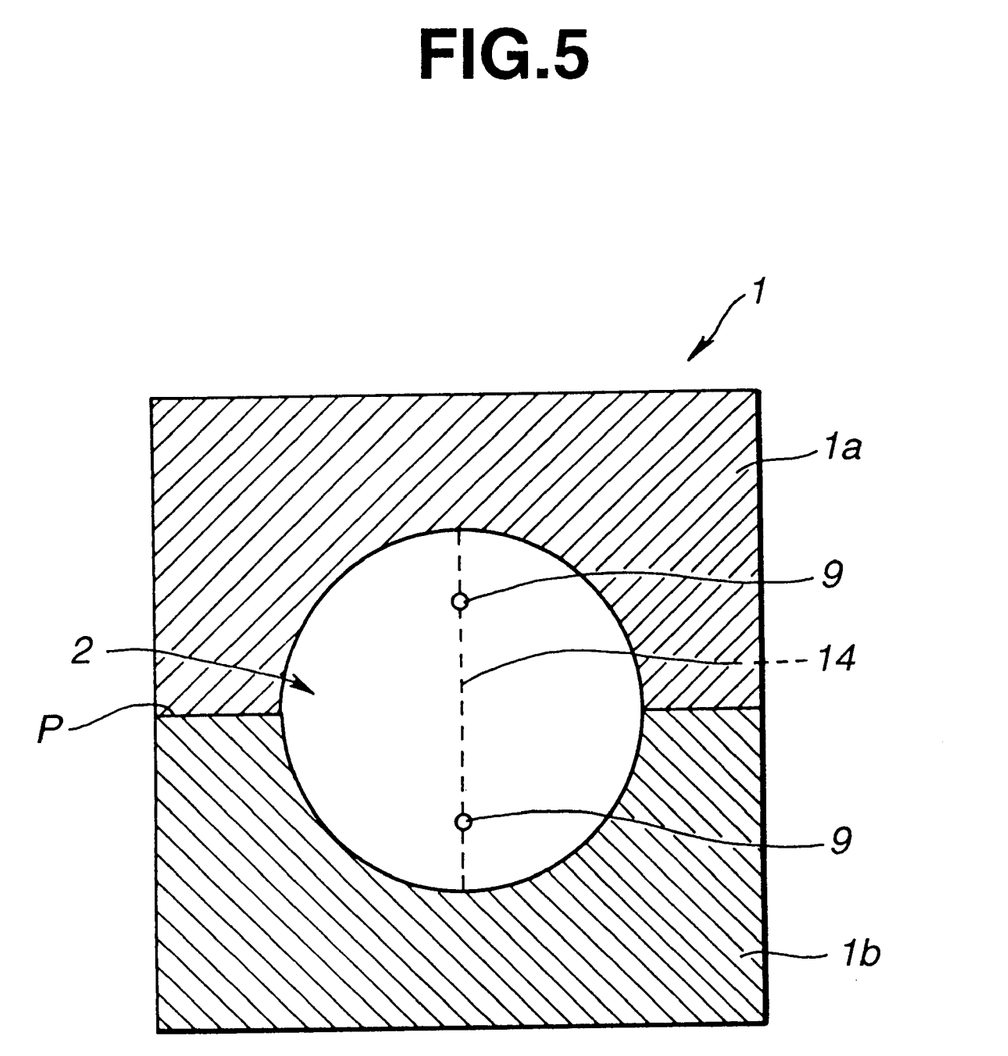
FIG. 5 is a cross-sectional view of a golf ball injection mold according to a further embodiment of the invention.

FIG. 5 illustrates a golf ball mold according to a further embodiment of the invention. The gates 9 are disposed along a longitude 14 on the cavity 2, the longitude 14 being a great circle connecting the opposite poles of the spherical cavity. The gates 9 are equidistantly spaced along the longitude 14. The number, configuration, diameter and other parameters of the gates are the same as in the foregoing embodiments.

With the above-described construction, the pressures applied from the molding material to the support pins supporting the core can be equalized and reduced, thereby preventing the core from being off-centered, without a need to reduce the original injection pressure applied to the molding material by the molding machine or even when the original injection pressure is increased.

When a golf ball is prepared by injection molding using the injection mold of the construction described above, the procedure and conditions are the same as in prior art injection molds. Illustratively, after the upper and lower mold sections 1a and 1b are removably mated to define the cavity 2 as shown in FIG. 7, cover molding material is injected by an injection molding machine (not shown) into the space 2a between the core 3 and the cavity-defining surface 2' through the gates 9 which are oriented to provide an optimum injection direction. More particularly, the core 3 is supported in place within the cavity 2 by the support pins 4 which are projected into the cavity. In this state, a predetermined amount of cover molding material is fed and injected into the space 2a. Immediately before or at the same time as the completion of injection, the support pins 4 are withdrawn until the distal ends of the pins 4 are flush with the cavity-defining surface 2'. The cover is formed around the core in this way. The injection mold of the invention is designed such that the cover molding material portions introduced into the cavity 2 or space 2' through the gates 9 are not directed to the core center C, but directed off the core center C. The off-centering flows are effective for reducing the pressures of the cover molding material portions (injected from the gates) applied to the core and preventing the core from being misaligned. In this way, a golf ball can be effectively molded.

No particular limit is imposed on the structure of the golf ball which can be prepared by injection molding using the mold of the invention. The invention is applicable to any type of golf balls including two-piece golf balls having a solid core and a cover, three- and multi-piece golf balls, and wound golf balls having a wound core and a cover, as long as the cover is injection molded using a mold. Even when a cover of a reduced gage (for example, a gage of 0.5 to 1.85 mm, especially 0.6 to 1.6 mm) is injection molded around a core of a single or multi-layer structure having a large diameter (for example, a diameter of 39 to 41.7 mm, especially 39.5 to 41.5 mm), the off-centering of the core and defective molding are avoided.

The cover molding material used herein is not critical as long as it is injection moldable. For example, thermoplastic resins such as ionomer resins are preferable.

Owing to the minimized misalignment or compression deformation of the core, the golf balls prepared using the mold of the invention and by the injection molding method of the invention are improved in symmetry and show consistent flight performance in that little difference occurs in distance and trajectory depending on the position where the ball is struck.

Although some preferred embodiments have been described, many modifications and variations may be made thereto in the light of the above teachings. For example, not only the gates, but also the nozzles may be oriented such that the joint angle of the nozzles to the cavity-defining surface is not 90° relative to a tangent to the cavity-defining surface. The number of support pins and other constructions may also be modified.

Experiment

By kneading and molding a core composition of the formulation shown in Table 1, solid cores having a diameter, hardness and weight as shown in Table 1 were prepared.

Figure 6A:
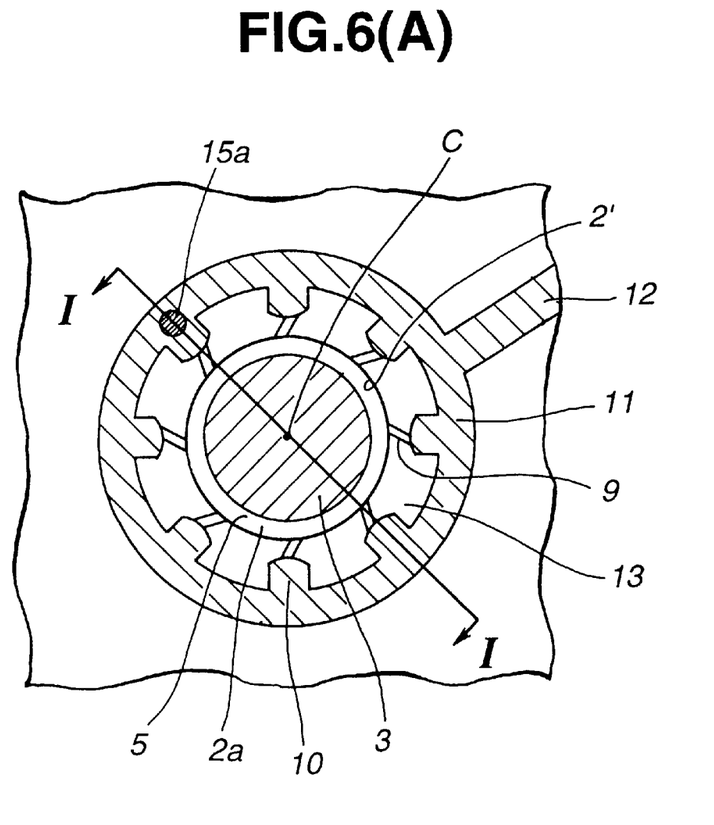
Figure 6B:
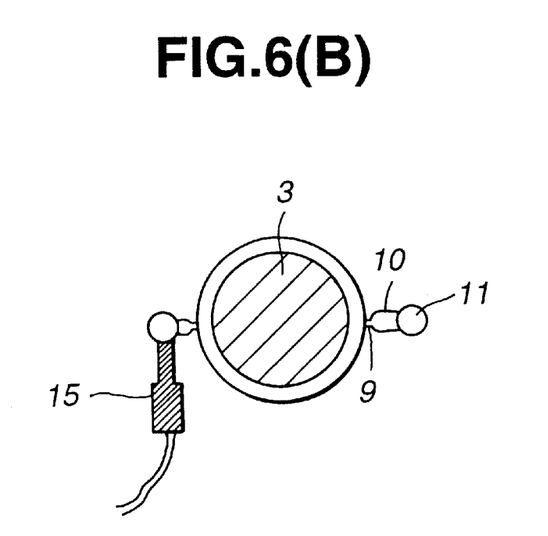

Covers were injection molded around the solid cores using an inventive mold and a comparative mold. The inventive mold was a mold as shown in FIG. 1 wherein the joint angle θ of the gate 9 to the cavity-defining surface 2' was 45° as measured relative to a tangent to the cavity-defining surface 2'. The comparative mold was the same as the inventive mold except that the joint angle θ of the gate 9 to the cavity-defining surface 2' was 90°. As shown in FIG. 7, the core was supported in place within the cavity 2 by eight support pins 4 (only four support pins are seen in FIG. 7). A cover stock of the formulation shown in Table 1 was injection molded, obtaining golf balls within and outside the scope of the invention. As shown in FIGS. 6A and 6B, a sensitive end 15a of a pressure sensor 15 was disposed in the annular runner 11 for measuring the pressure applied to the cover stock during injection. The golf balls were examined how they were molded. The results are shown in Table 2.

TABLE 1

| Solid core composition (pbw) | Cis-1,4-polybutadiene | 100 |
| --- | --- | --- |
| | Zinc acrylate | 20 |
| | Dicumyl peroxide | 1 |
| | Zinc oxide | 19.5 |
| Cover composition (pbw) | Ionomer resin, Himilan 1605/1706 | 50/50 |
| Solid core | Diameter | 41.0 mm |
| | Weight | 40.8 g |
| | Hardness* | 3.8 mm |
| Cover | Gage | 0.8 mm |
| | Shore D hardness | 60 |
| Ball | Diameter | 42.6 mm |
| | Weight | 45.3 g |
| | Hardness* | 3.3 mm |

*a deflection (mm) under a load of 100 kg

TABLE 2

Examination

Pressure applied during injection: 550 ± 30 kgf/cm²

| Example: | The core was little misaligned. An error of less than 0.2 mm was measured for a cover with a gage of 0.8 mm. |
| --- | --- |
| Comparative Example: | The core was misaligned. An error of 0.2 mm or more was measured for a cover with a gage of 0.8 mm. In some balls, bubble-like defects were found in the cover at upper and lower ends (or opposite poles) of the cavity. |

Using the injection mold having oblique gates according to the invention, there can be injection molded a golf ball which is minimized in misalignment of the core and improved in symmetry. The invention is advantageous particularly when a cover of a reduced gage is injection molded around a large diameter core.

We claim:

1. In a golf ball injection mold comprising; an upper mold section and a lower mold section which are removably mated to define a spherical cavity by respective concave surfaces, a plurality of support pins disposed in the mold sections for movement into and out of the cavity, and a plurality of gates disposed in fluid communication with an injection molding machine and the cavity for feeding a cover molding material from the injection molding machine into the cavity, wherein a golf ball having a core and a cover is prepared by moving the support pins into the cavity for vertically supporting the core at the center of the cavity, injecting the cover molding material into the space between the core and the cavity-defining surface through the gates, and withdrawing the support pins from the cavity when the space is filled with the cover molding material, thereby molding the cover around the core, said mold having six to twelve gates disposed at an equal spacing in the parting plane between the mold sections so that three to six pairs of gates are diametrically opposed and the gates are joined to the cavity-defining surface at an angle of 15° to 75° relative to a tangent to the cavity-defining surface and the angle of the respective gates have the same direction and the same value.

2. The golf ball injection mold of claim 1 wherein each gate is defined in a tubular form when the mold sections are mated.

3. The golf ball injection mold of claim 1 wherein the gates are oriented such that the sum of the vectors representing the forces of cover molding material portions injected into the cavity therethrough is zero.

4. A method for injection molding a golf ball having a core and a cover using the mold of claim 1, comprising the steps of:

removably mating the mold sections to define a hollow spherical cavity by their concave surfaces, placing the core in the cavity, moving the support pins into the cavity for supporting the core at the center of the cavity, injecting a cover molding material into the space between the core and the cavity-defining surface through the gates, and withdrawing the support pins from the cavity when the space is filled with the cover molding material, thereby molding the cover around the core.

5. The method of claim 4 wherein the cover has a gage of up to 2.0 mm.

* * * * *